United States Patent
Yanagawa et al.

(10) Patent No.: US 9,371,055 B2
(45) Date of Patent: Jun. 21, 2016

(54) PRE-TENSIONING MECHANISM

(71) Applicant: KABUSHIKI KAISHA TOKAI-RIKA-DENKI-SEISAKUSHO, Aichi-ken (JP)

(72) Inventors: Wataru Yanagawa, Aichi-ken (JP); Masaru Ukita, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 177 days.

(21) Appl. No.: 14/173,135

(22) Filed: Feb. 5, 2014

(65) Prior Publication Data

US 2014/0224915 A1 Aug. 14, 2014

(30) Foreign Application Priority Data

Feb. 8, 2013 (JP) ................. 2013-023780

(51) Int. Cl.
*B60R 22/38* (2006.01)
*B60R 22/46* (2006.01)

(52) U.S. Cl.
CPC ............ *B60R 22/46* (2013.01); *B60R 22/4633* (2013.01); *B60R 2022/468* (2013.01)

(58) Field of Classification Search
USPC ....................................... 242/374
See application file for complete search history.

(56) References Cited

U.S. PATENT DOCUMENTS

| | | | | |
|---|---|---|---|---|
| 3,895,539 A | * | 7/1975 | Weman | F16D 41/12 242/384 |
| 4,319,721 A | * | 3/1982 | Kawai | B60R 22/40 242/384.5 |
| 5,511,739 A | * | 4/1996 | Dybro | B60R 22/4676 242/379.1 |
| 5,636,806 A | * | 6/1997 | Sayles | B60R 22/3413 242/379.1 |
| 5,687,925 A | * | 11/1997 | Sayles | B60R 22/3413 242/379.1 |
| 2003/0209899 A1 | * | 11/2003 | Arnold | B60R 22/203 280/801.2 |
| 2007/0241223 A1 | * | 10/2007 | Boelstler | B60R 22/4633 242/374 |
| 2013/0256444 A1 | * | 10/2013 | Inagawa | B60R 22/4633 242/389 |
| 2014/0145020 A1 | * | 5/2014 | Gentner | B60R 22/46 242/374 |

FOREIGN PATENT DOCUMENTS

| | | |
|---|---|---|
| JP | 8-207706 A | 8/1996 |
| JP | 2004301331 A | 10/2004 |

OTHER PUBLICATIONS

Japanese Office Action corresponding to application No. 2013-023780 dated Apr. 26, 2016, and English translation.

* cited by examiner

*Primary Examiner* — Sang Kim
(74) *Attorney, Agent, or Firm* — Roberts Mlotkowski Safran & Cole P.C.

(57) ABSTRACT

In a webbing take-up device, due to actuation of a pre-tensioning mechanism when a vehicle collision, a piston is moved, rack teeth of the piston mesh with pinion teeth of a pinion, causing the pinion rotate and a spool to be rotated in the take-up direction. In a state where a large rotational force in the pull-out direction is acting from an occupant on the pinion, through a webbing and the spool, a rack tooth is broken by a pinion tooth when the rack teeth initially mesh with the pinion teeth, especially by a tip end of the rack tooth meshing with the pinion tooth. Therefore, sticking-in of the pinion teeth rack teeth and the pinion teeth can be suppressed, or easily eliminated, enabling loss in force transmitted from the piston to the pinion to be reduced.

10 Claims, 10 Drawing Sheets

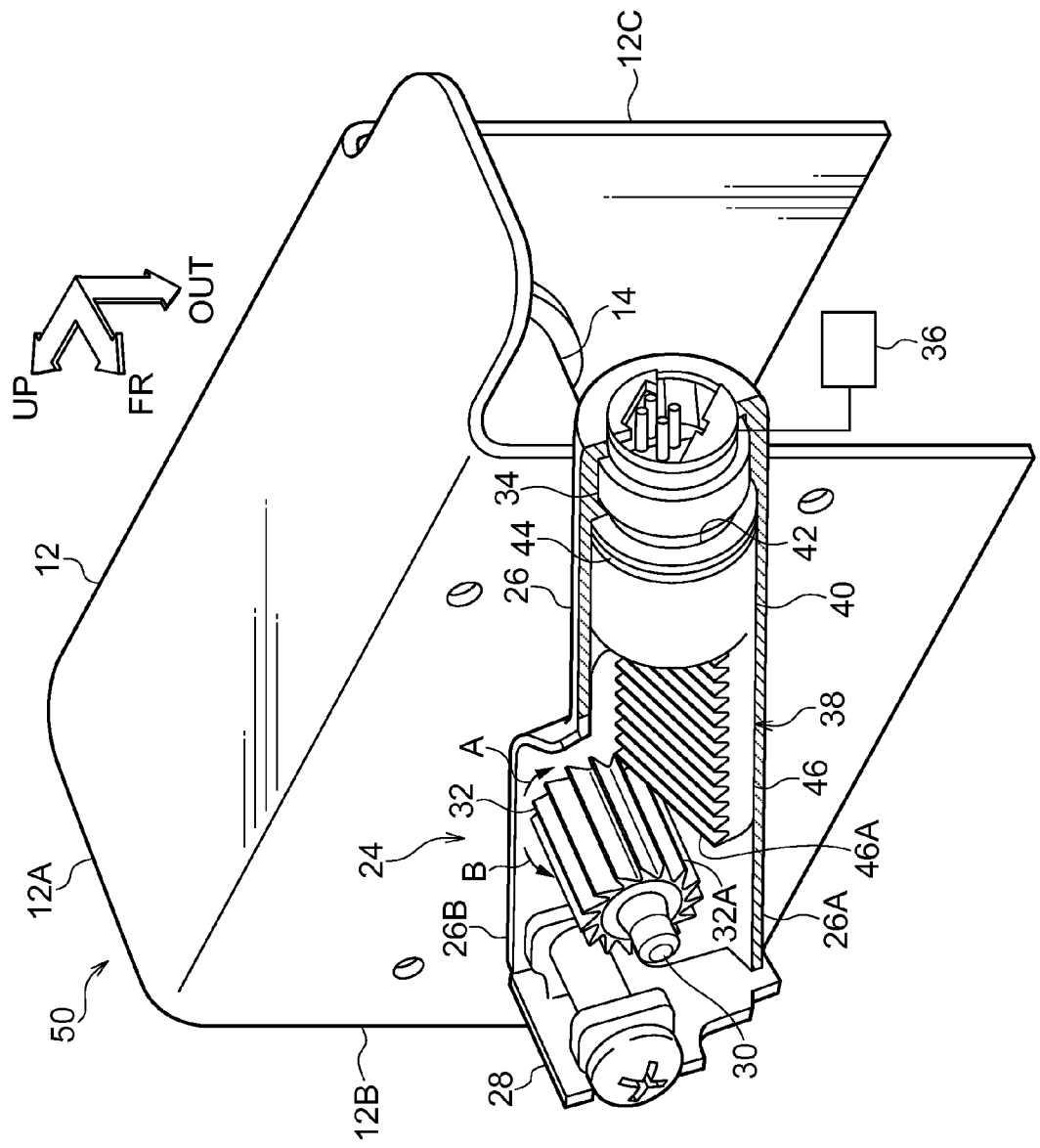

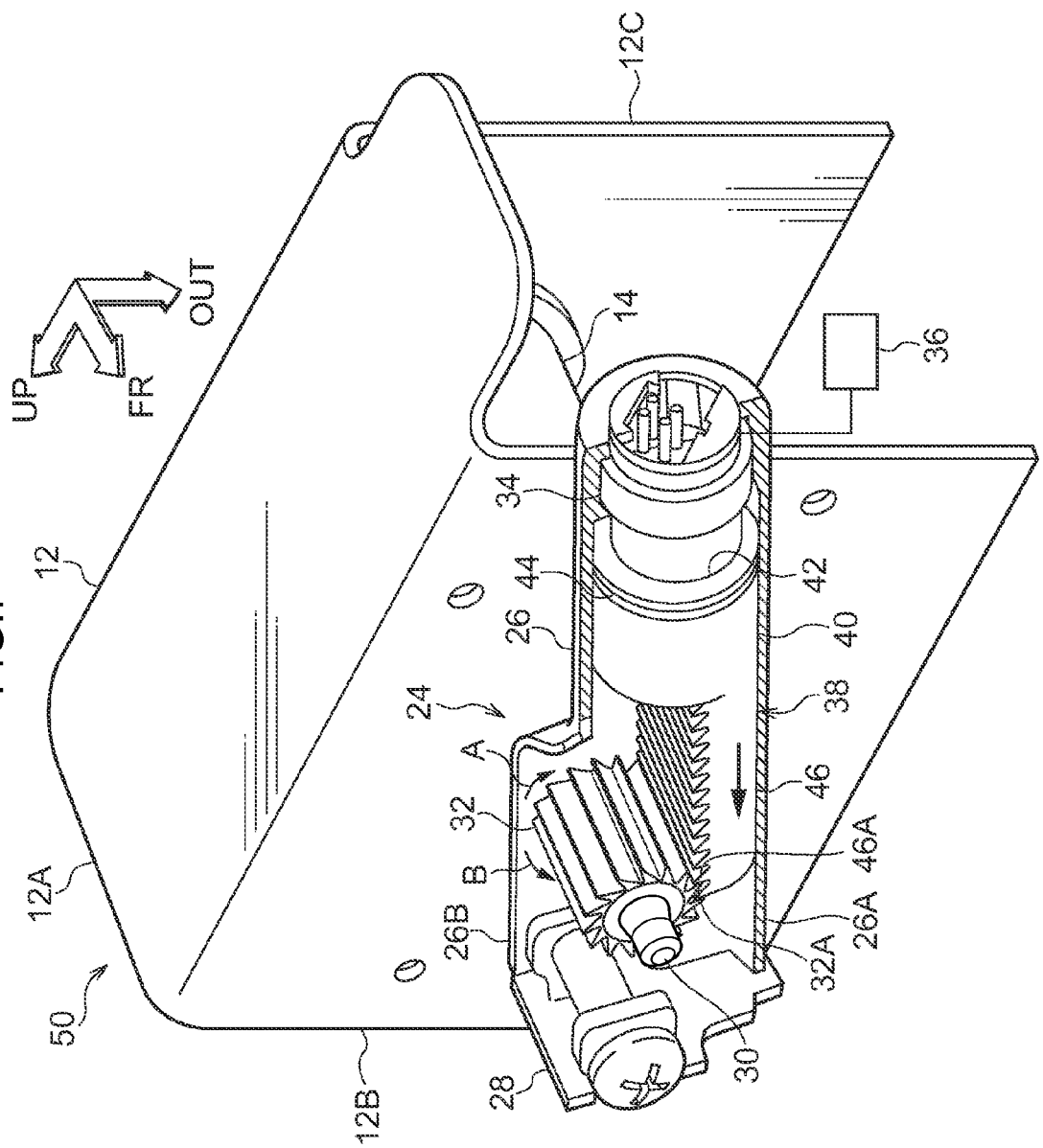

PRE-TENSIONING MECHANISM

CROSS-REFERENCE TO RELATED APPLICATION

This application claims priority under 35 USC 119 from Japanese Patent Application No. 2013-023780 filed Feb. 8, 2013 the disclosure of which is incorporated by reference herein.

BACKGROUND

1. Field of the Invention

The present invention relates to a pre-tensioning mechanism in which a rotating member is rotated and a take-up member is rotated in a take-up direction by a moving member being moved.

2. Related Art

In a seat belt take-up device described in Japanese Patent Application Laid-Open (JP-A) No. 8-207706, a piston rod is moved, and a teeth portion of the piston rod meshes with a teeth portion of a toothed ratchet, thereby rotating the toothed ratchet in the take-up direction and taking up a seat belt by the retractor rotating in the take-up direction.

In the seat belt take-up device therein, it is recognized that the retractor is made capable of rotating integrally with the toothed ratchet even at a time before the piston rod is moved. It is accordingly may be possible that, in a state in which a large rotational force in a pull-out direction (the direction opposite to the take-up direction) is applied through the seat belt and the retractor to the toothed ratchet from an occupant of a vehicle wearing the seat belt, sticking-in (digging-in) of the toothed portion of the piston rod and the toothed portion of the toothed ratchet occurs due to the meshing of the toothed portion of the piston rod with the toothed portion of the toothed ratchet. This consequently gives rise to the possibility of a loss in a force transmitted from the piston rod to the toothed ratchet.

SUMMARY

In consideration of the above circumstances, the present invention provides a pre-tensioning mechanism that enables the loss in a force transmitted from a moving member to a rotating member to be reduced.

A pre-tensioning mechanism of a first aspect includes: a webbing that is applied to an occupant of a vehicle; a take-up member that takes up the webbing by rotating in a take-up direction; a moving member that is provided with a moving tooth and is capable of moving; and a rotating member that is capable of rotating according to rotation of the take-up member prior to the moving member moving, that is provided with a rotating tooth having a hardness different from a hardness of the moving tooth, and that rotates by the moving member moving and the moving tooth engaging with the rotating tooth whereby the take-up member is rotated in the take-up direction, wherein at least one of the moving tooth or the rotating tooth is deformable when the moving tooth initially engages with the rotating tooth.

A pre-tensioning mechanism of a second aspect is the pre-tensioning mechanism of the first aspect, wherein a plurality of moving teeth are engaged at the same time with a plurality of rotating teeth when the moving member is moved.

A pre-tensioning mechanism of a third aspect is the pre-tensioning mechanism of the first aspect or the second aspect, wherein a part of one of the moving tooth or the rotating tooth is engaged with the other of the moving tooth or the rotating tooth when the moving tooth initially engages with the rotating tooth.

A pre-tensioning mechanism of a fourth aspect is the pre-tensioning mechanism of the third aspect, wherein the moving tooth is displaced toward a side of the rotating tooth by the moving tooth engaging with the rotating tooth, whereby an amount of engagement of one of the moving tooth or the rotating tooth with the other of the moving tooth or the rotating tooth portion is increased.

A pre-tensioning mechanism of a fifth aspect is the pre-tensioning mechanism of the third aspect or the fourth aspect, further including a guide member that is configured to enable guiding of movement of the moving member, wherein: the guide member is provided with an inner peripheral face having a circular arc shape in cross-section, and an outer peripheral face, having a circular arc shape in cross-section, of the moving member is disposed at the inner peripheral face of the guide member in a state in which an extension direction of the moving tooth is inclined with respect to an extension direction of the rotating tooth.

In the pre-tensioning mechanism of the first aspect, the moving member is moved and the moving tooth of the moving member engages with the rotating tooth of the rotating member, so, the rotating member is rotated and the take-up member is rotated in the take-up direction. The webbing is thereby taken up by the take-up member.

Moreover, the rotating member is capable of rotating according to the rotation of the take-up member before the moving member is moved. The moving tooth is therefore capable of engaging with the rotating tooth in a state in which a large rotational force from the occupant wearing the webbing, through the webbing and the take-up member, has acted on the rotating member.

Configuration is made such that the hardness of the moving tooth is different from that of the rotating tooth and at least one of the moving tooth or the rotating tooth is deformable ("deformable" including "broken") when firstly the moving tooth engages with the rotating tooth. Thus the deformation of at least one of the moving tooth or the rotating tooth enables the sticking-in of the moving tooth and the rotating tooth to be suppressed, or the sticking-in of the moving tooth and the rotating tooth to be easily eliminated, thereby enabling the loss in the force transmitted from the moving member to the rotating member to be reduced.

In the pre-tensioning mechanism of the second aspect, plural moving teeth are simultaneously engaged with plural rotating teeth when the moving member is moved. Effective transmission of force from the moving member to the rotating member is thereby enabled, even though at least one of the moving teeth or the rotating teeth is deformed when the moving and rotating teeth are initially engaged.

In the pre-tensioning mechanism of the third aspect, the portion of one of the moving tooth or the rotating tooth is engaged with the other of the moving tooth or the rotating tooth when initial engaging of the moving tooth with the rotating tooth. Therefore, one of the moving tooth or the rotating tooth is easily deformed, thereby enabling the sticking-in of the moving tooth and the rotating tooth to be effectively suppressed or the sticking-in between the moving tooth and rotating tooth to be eliminated more easily.

In the pre-tensioning mechanism of the fourth aspect, the moving tooth is displaced towards the rotating tooth side by the engagement of the moving tooth with the rotating tooth, increasing the amount of engagement between one of the moving tooth or the rotating tooth with the other. Thus more effective transmission of the force from the moving member to the rotating member is enabled, even though at least one of the moving tooth or the rotating tooth is deformed when the moving tooth initially engage with the rotating tooth.

In the pre-tensioning mechanism of the fifth aspect, the guide member is capable of guiding the movement of the moving member.

The outer peripheral face of the moving member is disposed at the inner peripheral face of the guide member in a state in which an extension direction of the moving tooth is inclined with respect to an extension direction of the rotating tooth. Thus one portion of one of the moving tooth or the rotating tooth is capable of engaging with the other of the moving tooth or the rotating tooth when the moving tooth initially engage with the rotating tooth.

Moreover, the circular arc shaped cross-section outer peripheral face of the moving member is disposed at the circular arc shaped cross-section inner peripheral face of the guide member. Therefore, due to the moving tooth engaging with the rotating tooth portion, the moving member is capable of rotating in a circumferential movement direction whilst being guided by the guide member and the moving tooth is easily displaced to the rotating tooth side.

BRIEF DESCRIPTION OF THE DRAWINGS

Embodiments of the invention will be described in detail with reference to the following figures, wherein:

FIG. 4A illustrates a first stage at meshing start between the piston and the pinion; FIG. 4B illustrates a second stage at meshing start between the piston and the pinion; FIG. 4C illustrates a third stage at meshing start between the piston and the pinion; FIG. 4D illustrates a fourth stage at meshing start between the piston and the pinion;

FIG. 5 is a perspective view illustrating a webbing take-up device of a second exemplary embodiment of the present invention;

FIG. 7 is a perspective view illustrating the piston and the pinion of the webbing take-up device of the second exemplary embodiment of the present invention after meshing start;

FIG. 8A illustrates the initial state (before meshing) of the piston and the pinion; FIG. 8B illustrates early-stage-meshing start of the piston and the pinion; FIG. 8C illustrates late-meshing-start of the piston and pinion.

DETAILED DESCRIPTION

First Exemplary Embodiment

Figure 1:
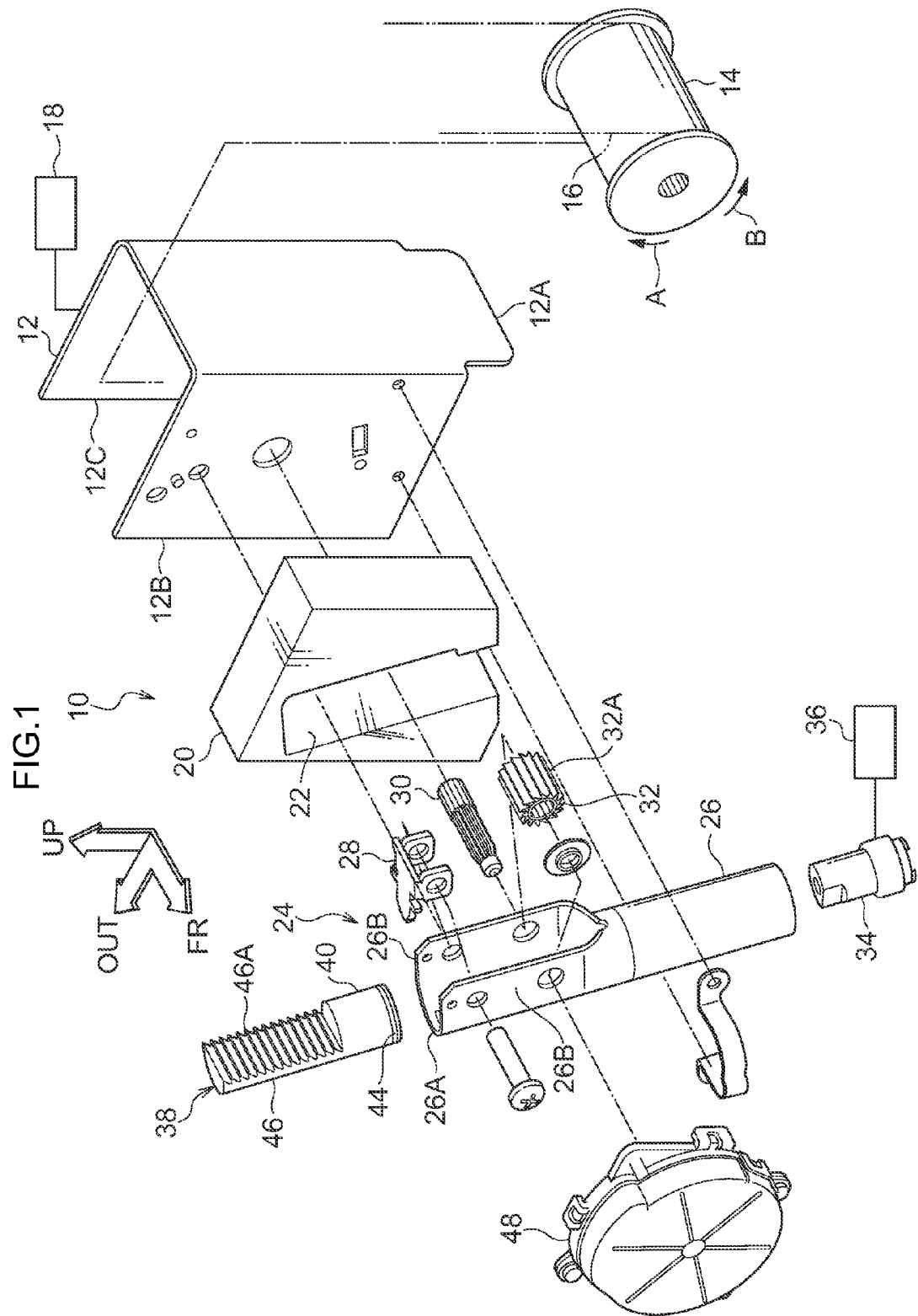
FIG. 1 is an exploded perspective view illustrating a webbing take-up device of a first exemplary embodiment of the present invention.
Figure 2:
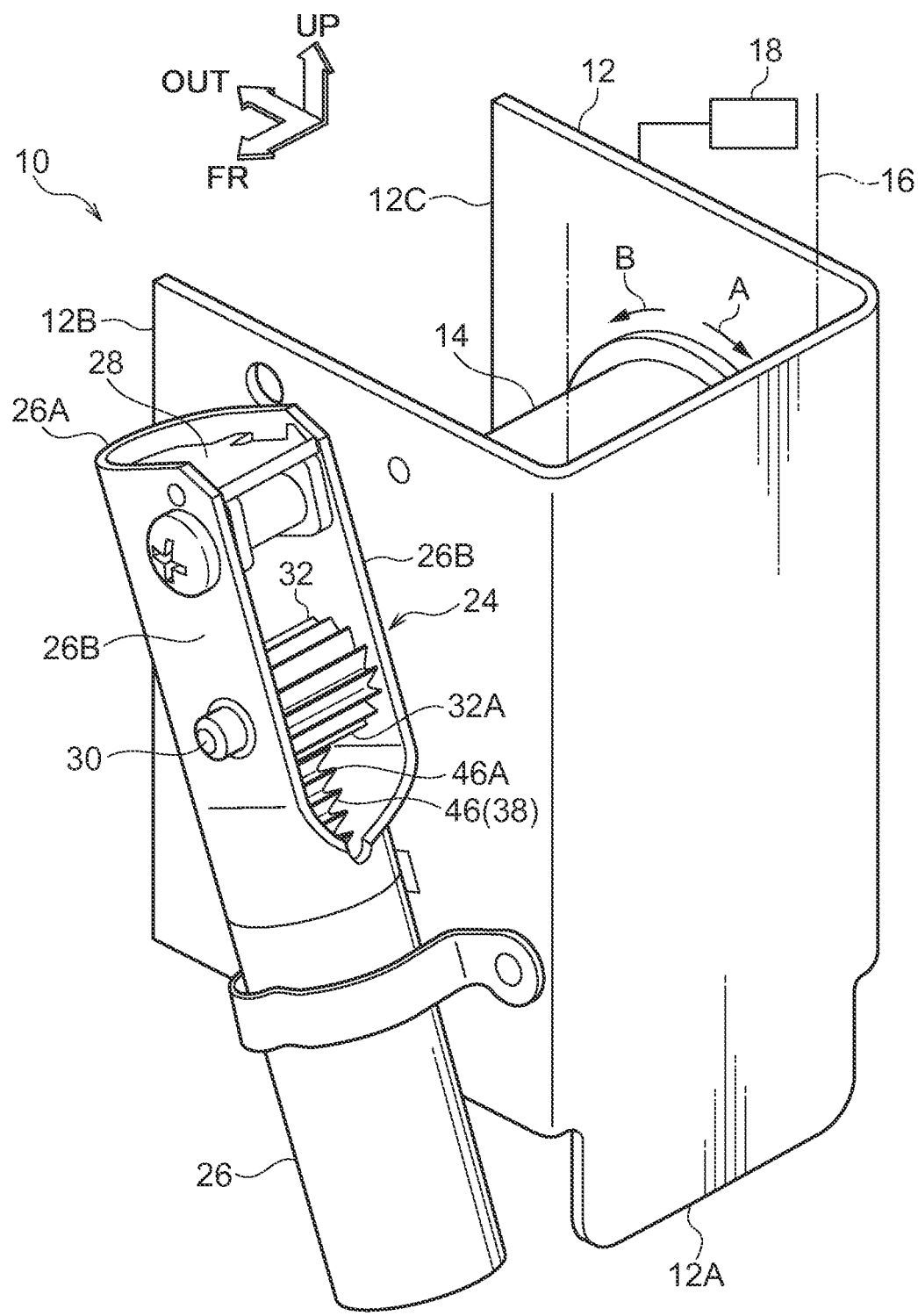
FIG. 2 is a perspective view illustrating the webbing take-up device of the first exemplary embodiment of the present invention.

FIG. 1 is an exploded perspective view illustrating a webbing take-up device 10 applied with a pre-tensioning mechanism 24 of a first exemplary embodiment of the present invention. FIG. 2 is a perspective view illustrating the webbing take-up device 10. Note that in that figures the arrow OUT indicates a vehicle width direction outside, the arrow FR indicates one side in the vehicle front-rear direction and the arrow UP indicates the vehicle upward direction.

As illustrated in FIG. 1 and FIG. 2, a metal, plate shaped frame 12 of U-shaped cross-section profile serves as a supporting member and is provided at the webbing take-up device 10 of the present exemplary embodiment. The frame 12 is provided with a back plate 12A on a back face side, a leg plate 12B on one side, and a leg plate 12C on another side. The webbing take-up device 10 is fixed by the back plate 12A of the frame 12 in a rectangular tube shaped pillar (not shown in the drawings) that acts as a vehicle framework member, and the webbing take-up device 10 is thereby installed to the vehicle. The front face side, one side, and the upper side of the webbing take-up device 10 respectively are directed towards the vehicle width direction outside, the one vehicle front-rear direction side (a vehicle front side or a vehicle rear side) and the vehicle upward direction.

A metal spool 14 (a take-up shaft) of substantially cylindrical shape serves as a take-up member and is rotatably supported between the leg plate 12B and the leg plate 12C of the frame 12. Long belt shaped webbing 16 (a belt) is taken up from its base end side onto the spool 14. The webbing 16 extends from the frame 12 towards the upper side and is so as to be wearable by an occupant seated in a vehicle seat (not shown in the drawings). Moreover, the webbing 16 is taken up on the spool 14 by the spool 14 rotating in a take-up direction (the direction indicated by arrow A in FIG. 1 and FIG. 2), and the spool 14 is rotated in a pull-out direction (the direction indicated by arrow B in FIG. 1 and FIG. 2) when the webbing 16 is pulled out from the spool 14.

A locking mechanism 18 serving as a restriction section (a locking section) is provided at the leg plate 12C of the frame 12. In the event of the webbing 16 being rapidly pulled out from the spool 14 or the vehicle rapidly decelerating, the locking mechanism 18 actuates and the pull-out direction rotation of the spool 14 is thereby restricted (locked) by the locking mechanism 18 (the spool 14 is still permitted to rotate in the take-up direction).

A substantially rectangular parallelopiped shaped body 20 is fixed at the outside of the leg plate 12B of the frame 12. A long rectangular shaped housing hole (cavity) 22 is formed so as to penetrate the body 20. A length direction of the housing cavity 22 is inclined towards the opposite side to the back plate 12A side (the vehicle width direction outside) on progression upwards. The housing cavity 22 is open towards a length direction lower side.

Figure 3:
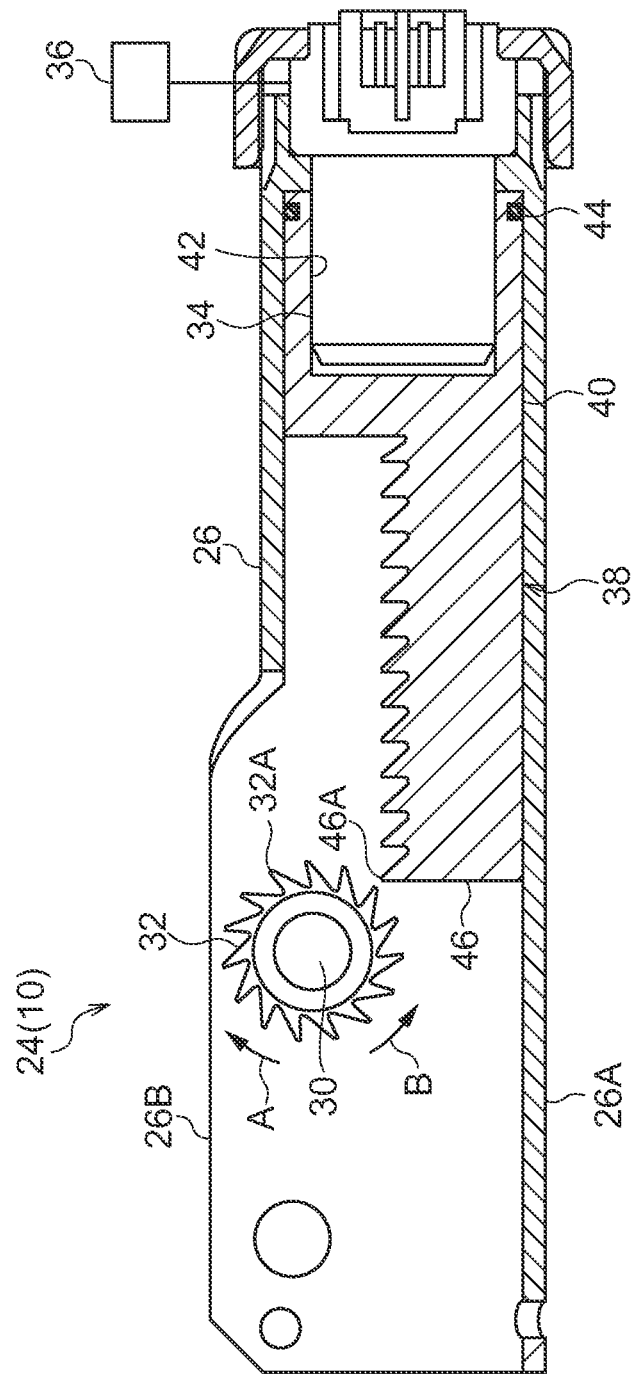
FIG. 3 is a cross-section view illustrating a pre-tensioning mechanism of the first exemplary embodiment as viewed from one side.

The pre-tensioning mechanism 24 that employs the rack and pinion system illustrated in detail in FIG. 3 is provided at the outside of the leg plate 12B of the frame 12.

A metal, substantially cylindrical tube shaped cylinder 26 that serves as a guide member is fixed to the outside of the leg plate 12B of the frame 12. The cylinder 26 is housed in the housing cavity 22 of the body 20 and has an axial direction that inclines towards the opposite side to the side of the back plate 12A on progression upward. A lower side portion (a base end side portion) of the cylinder 26 is configured as a cylindrical tube, and an upper side portion (a leading end portion) of the cylinder 26 is configured with a U-shaped cross-section profile with the inside open towards the back plate 12A side (the vehicle width direction inside).

A portion of cylinder 26 that is at the upper side and is at the opposite side from the back plate 12A side is configured as a guide member 26A, with the guide member 26A being curved so as to have a circular arc shaped cross-section. A portion of cylinder 26 that is at the upper side and at the back plate 12A side is configured by a pair of support portions 26B. The support portions 26B are configured as flat plate shapes that run parallel to the leg plate 12B. Moreover, a plate shaped stopper plate 28 is fixed to the inside at the upper end of the cylinder 26. The stopper plate 28 closes off the upper end of the cylinder 26.

A metal, substantially circular pillar shaped pinion shaft 30 that serves as a connecting member is supported at a lower portion between the pair of support portions 26B. The pinion shaft 30 penetrates the support portions 26B so as to be capable of rotation. A diameter of a portion of the pinion shaft 30 that penetrates the supporting portion 26B is set slightly smaller than a diameter of the pinion shaft 30-through-hole in the support portion 26B, and the pinion shaft 30 (including a pinion 32, described below) is configured so as to enable slight displacement in a radial direction. An end portion of the leg plate 12B side of the pinion shaft 30 penetrates the leg plate 12B so as to be capable of rotation, and is fixed coaxially to the spool 14. The pinion shaft 30 is configured so as to be capable of rotating integrally with the spool 14.

The metal pinion 32 that serves as a rotating member is fixed to the pinion shaft 30 at an axial direction intermediate portion and inside an upper side portion of the cylinder 26, and coaxial to the pinion shaft 30. The pinion 32 is capable of rotating integrally with the pinion shaft 30. Pinion teeth 32A that serve as a rotating tooth and have substantially right angled triangle shaped cross-section profiles are formed so as to protrude from the entire outer periphery of the pinion 32. The pinion teeth 32A extend parallel to the axial direction of the pinion 32, with pull-out direction side faces of the pinion teeth 32A disposed substantially perpendicular to the circumferential direction of the pinion 32, and with the pinion teeth 32A disposed so as to be uniformly spaced along the circumferential direction of the pinion 32.

A substantially circular pillar shaped gas generator 34 that serves as moving means is inserted and fixed inside and coaxial to a lower end of the cylinder 26. The gas generator 34 closes off a lower end of the cylinder 26. The gas generator 34 is electrically connected to a vehicle controller 36. In the event of a collision (upon a vehicle collision being detected, or at a specific event that is a vehicular emergency) the pretensioning mechanism 24 is actuated by control of the controller 36 and the gas generator 34 accordingly rapidly generates high pressure gas that is supplied to the lower end inside of the cylinder 26.

A metal piston 38 that serves as a moving member and that is substantially circular pillar shaped is provided inside the cylinder 26.

A lower portion of the piston 38 is configured as a substantially circular pillar shaped base portion 40. A circular cross-section outer peripheral face of the base portion 40 is fitted (disposed) into a circular cross-section inner peripheral face of the lower side portion of the cylinder 26, and is thereby coaxially disposed to the cylinder 26. A circular pillar shaped insertion hole 42 is coaxially formed in the base portion 40. The insertion hole 42 opens from a lower side face of the base portion 40, and the gas generator 34 is inserted into and substantially fits with the insertion hole 42.

A circular ring shaped O-ring 44 serving as a sealing member is fixed at an outer circumference of the base portion 40. The O-ring 44 is made from rubber or the like, and has elastic and sealing characteristics. The O-ring 44 makes contact along the full circumference of the outer peripheral face of the base portion 40 and the inner peripheral face at the lower side portion of the cylinder 26 while in an elastically deformed state, with sealing thereby formed between the cylinder 26 and the piston 38 by the O-ring 44.

A portion at the upper side with respect to the base portion 40 of the piston 38 is configured as a substantially semicircular pillar shaped rack 46. The semicircular cross-sectioned outer peripheral face (back face) of the rack 46 is fitted (disposed) at the circular cross-section inner peripheral face at the lower side portion of the cylinder 26 and at a semicircular cross-section inner peripheral face of the guide member 26A. The upper side end of the rack 46 is disposed at close proximity to (in the vicinity of) and at the lower side of the pinion 32. Rack teeth 46A that serve as a moving tooth are formed with substantially right angled triangle shaped cross-section profiles over the entire face at back plate 12A side (at vehicle width direction inside) of the rack 46. The rack teeth 46A are disposed so as to extend perpendicular to the axial direction of the piston 38, at uniform spacing along the axial direction of the piston 38 with upper side faces perpendicular to the axial direction of the piston 38. The rack teeth 46A are configured so as to extend in a direction parallel to the extension direction of the pinion teeth 32A of the pinion 32, and an extension dimension of the rack teeth 46A is set equivalent to an extension dimension of the pinion teeth 32A. Moreover, the hardness (generally the material mechanical hardness such as measured by Rockwell hardness HRC or Vickers hardness HV) of the piston 38 (including the rack teeth 46A) is set less than that of the pinion 32 (including the pinion teeth 32A), and the strength of the rack teeth 46A is set less than that of the pinion teeth 32A. Note that even in a case in which the same material (iron for example) is used for both the piston 38 (including the rack teeth 46A) and the pinion 32 (including the pinion teeth 32A), the hardnesses of the piston 38 and the pinion 32 are set to different values by for example heat treatment therefor. Alternatively, the hardnesses are set to different values by using different materials for each (for example, iron and aluminum, iron and resin, or aluminum and resin).

A biasing mechanism 48 is provided to the body 20 at the opposite side to the leg plate 12B side, and a flat spiral spring (power spring) (not shown in the drawings) that serves as a biasing member is provided inside the biasing mechanism 48. The flat spiral spring is joined to the pinion shaft 30, and the flat spiral spring applying a biasing force in the take-up direction through the pinion shaft 30 to the spool 14.

Explanation follows regarding the operation of the present exemplary embodiment.

In the webbing take-up device 10 configured as described above, when the webbing 16 is worn by the occupant seated in the vehicle seat, slack in the webbing 16 is eliminated due to the flat spiral spring of the biasing mechanism 48 applying a biasing force in the take-up direction to the spool 14.

In the event of a vehicle collision, the locking mechanism 18 is actuated upon the webbing 16 being rapidly pulled out from the spool 14 or upon rapid deceleration of the vehicle, and the locking mechanism 18 accordingly restricts the rotation of the spool 14 in the pull-out direction. The withdrawal of the webbing 16 from the spool 14 is thereby restricted and the occupant is restrained by the webbing 16.

Moreover, the pre-tensioning mechanism 24 is actuated in the event of a vehicle collision by control by the controller 36, and the gas generator 34 accordingly rapidly generates high pressure gas, and the gas is supplied to the lower end inside of the cylinder 26. Accordingly, in a state in which sealing is maintained by the O-ring 44 between the cylinder 26 and the piston 38, the piston 38 (the base portion 40) and the O-ring 44 receives the pressure of the gas from the lower side (axial direction another side), and the piston 38 and the O-ring 44 are moved (slid) towards an upper side (axial direction one side) whilst being guided with the cylinder 26 (the lower side portion thereof and the guide member 26A). The rack 46 (the rack teeth 46A) of the piston 38 thereby meshes with (engages with) the pinion 32 (the pinion teeth 32A), and the pinion 32 is rotated in the take-up direction. The pinion shaft 30, that is integral to the pinion 32, and the spool 14 are rotated in the take-up direction, and the webbing 16 is thereby taken up on the spool 14, increasing restraining force of the webbing 16 acting on the occupant.

Due to the spool 14 and the pinion 32 always being joined (connected) together via the pinion shaft 30, it is configured that the spool 14 and the pinion 32 can rotate integrally even at a time before the actuation of the pre-tensioning mechanism 24 (before the piston 38 is moved by the pressure of the gas from the gas generator 34).

Figure 4A:
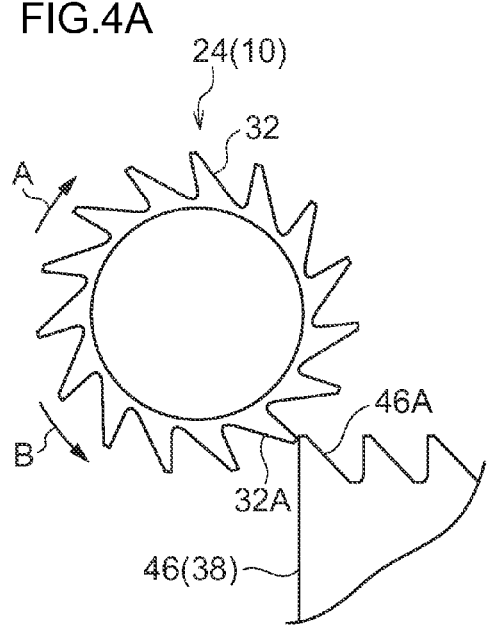
FIGS. 4A to 4D are side face views illustrating meshing states of a piston and a pinion of the pre-tensioning mechanism of the first exemplary embodiment of the present invention, as viewed from the one side.

Therefore, when the pre-tensioning mechanism 24 is actuated at the time of a vehicle collision, there is a possibility that firstly the rack tooth 46A (the rack tooth at the uppermost end of the rack 46, referred to as the "first rack tooth 46A" below) meshes with the pinion tooth 32A (referred to as the "first pinion tooth 32A" below) (see FIG. 4A) in a state in which, due to the occupant moving under inertia, a large pull-out direction rotational force from the occupant is acting on the pinion 32 through the webbing 16, the spool 14 and the pinion shaft 30 (especially in a state in which the pinion 32 is rotated in the pull-out direction prior to the actuation of the locking mechanism 18).

The hardness of the rack teeth 46A is set less than that of the pinion teeth 32A and the strength of the rack teeth 46A is set less than that of the pinion teeth 32A.

Figure 4B:
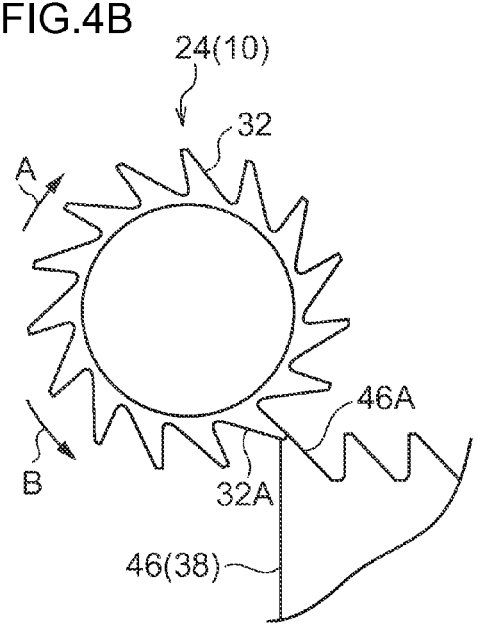

A tip end of the first rack tooth 46A is therefore broken (sheared, cut) by a tip end of the first pinion tooth 32A when the first rack tooth 46A meshes with the first pinion tooth 32A and especially when the tip end of the first rack tooth 46A is meshed with the tip end of the first pinion tooth 32A (see FIG. 4B). Sticking-in (digging-in) of the first rack tooth 46A and the first pinion tooth 32A can accordingly be suppressed, or sticking-in of the first rack tooth 46A and the first pinion tooth 32A can be easy released or eliminated, by the break of the tip end of the first rack tooth 46A, enabling the loss of force transmitted from the piston 38 (the rack 46) to the pinion 32 be reduced.

Figure 4C:
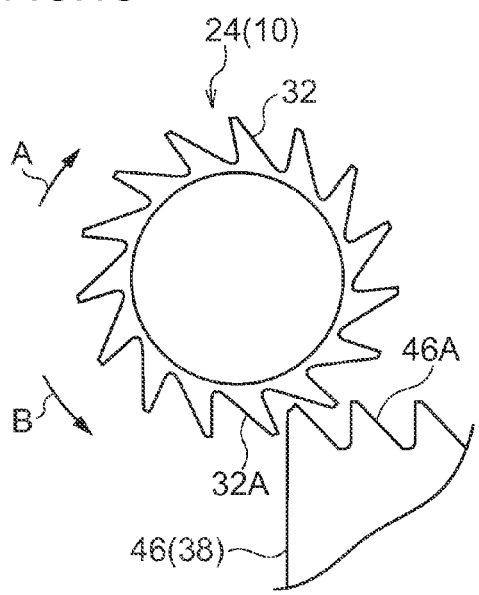

Moreover, when the first rack tooth 46A has meshed with the first pinion tooth 32A, the rotational force of the pinion 32, the pinion shaft 30 and the spool 14 in the pull-out direction is reduced due to the take-up direction rotational force applied by the piston 38 (the rack 46) to the pinion 32, and, for example, the pinion 32, and the pinion shaft 30 and the spool 14 is rotated in the take-up direction (see FIG. 4C).

When, immediately after the first rack tooth 46A has meshed with the first pinion tooth 32A, a rack tooth 46A at a lower side of the first rack tooth 46A (referred to below as the "second rack tooth 46A") then meshes with the first pinion tooth 32A or with a pinion tooth 32A at a pull-out direction side of the first pinion tooth 32A (referred to below as the "second rack tooth 32A"), for example, a base end side position (portion) of the second rack tooth 46A, which position is at further the base end side than the position (tip end) of the first rack tooth 46A which has meshed with the tip end of the first pinion tooth 32A, is meshed with the tip end of the first pinion tooth 32A or the second pinion tooth 32A. This means that for the second rack tooth 46A to be broken by the first pinion tooth 32A or the second pinion tooth 32A, the break thickness of the second rack tooth 46A becomes greater (see FIG. 4D).

Figure 4D:
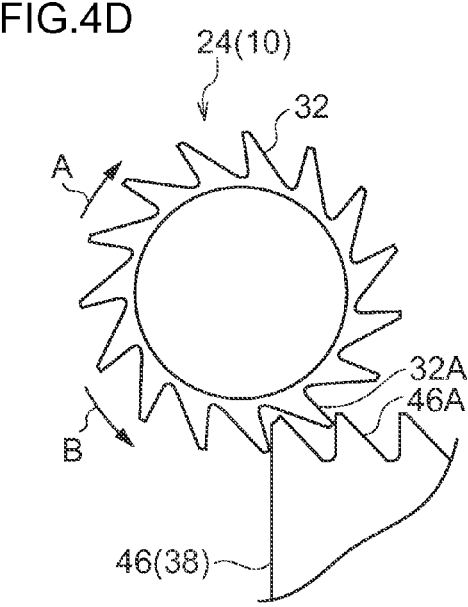

Moreover, at the time as the second rack tooth 46A has meshed with the first pinion tooth 32A or with the second pinion tooth 32A, at the same time, the first rack tooth 46A meshes with a pinion tooth 32A at a take-up direction side of the first pinion tooth 32A, or with the first pinion tooth 32A (see FIG. 4D).

Breaking of the second rack tooth 46A by the first pinion tooth 32A or by the second pinion tooth 32A can accordingly be suppressed when the second rack tooth 46A has meshed with the first pinion tooth 32A or with the second pinion tooth 32A.

Further, after the second rack tooth 46A having meshed with the first pinion tooth 32A or with the second pinion tooth 32A, there are always plural (two teeth in the present exemplary embodiment) rack teeth 46A meshed with the plural (two teeth in the present exemplary embodiment) pinion teeth 32A at the same time.

Thus, after the second rack tooth 46A having meshed with the first pinion tooth 32A or with the second pinion tooth 32A, breaking of the rack teeth 46A by the pinion teeth 32A can always be suppressed, enabling effective transmission of the force from the piston 38 (the rack 46) to the pinion 32.

Furthermore, upper side faces of the rack teeth 46A that are meshed with the pinion teeth 32A are disposed perpendicular to the movement direction (the axial direction) of the piston 38 (the rack 46). The upper side faces of the rack teeth 46A are therefore capable of effectively pushing the pinion teeth 32A in the take-up direction, enabling more effective force transmission from the piston 38 (the rack 46) to the pinion 32, by the movement of the piston 38 (the rack 46).

Consequently, the pinion 32, the pinion shaft 30 and the spool 14 can be effectively rotated in the take-up direction by the movement of the piston 38 (the rack 46), enabling the spool 14 to effectively wind up the webbing 16, and enabling the restraining force of the webbing 16 upon the occupant to be effectively increased.

Second Exemplary Embodiment

Figure 8A:
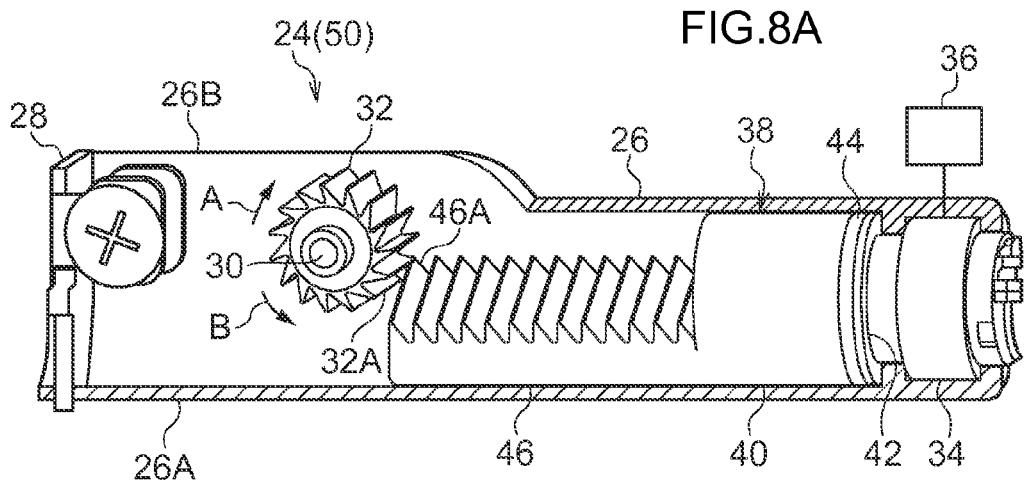
FIGS. 8A to 8C are cross-section views illustrating meshed states of the piston and the pinion of the pre-tensioning mechanism of the second exemplary embodiment of the present invention as viewed from the one side.

FIG. 5 is a perspective view illustrating a webbing take-up device 50 of a second exemplary embodiment of the present invention applied with the pre-tensioning mechanism 24. FIG. 8A is a cross-section view illustrating the pre-tensioning mechanism 24 of the webbing take-up device 50 as viewed from a side.

The configuration of webbing take-up device 50 of the present exemplary embodiment is substantially the same as the first exemplary embodiment but differs in the following points.

Figure 9:
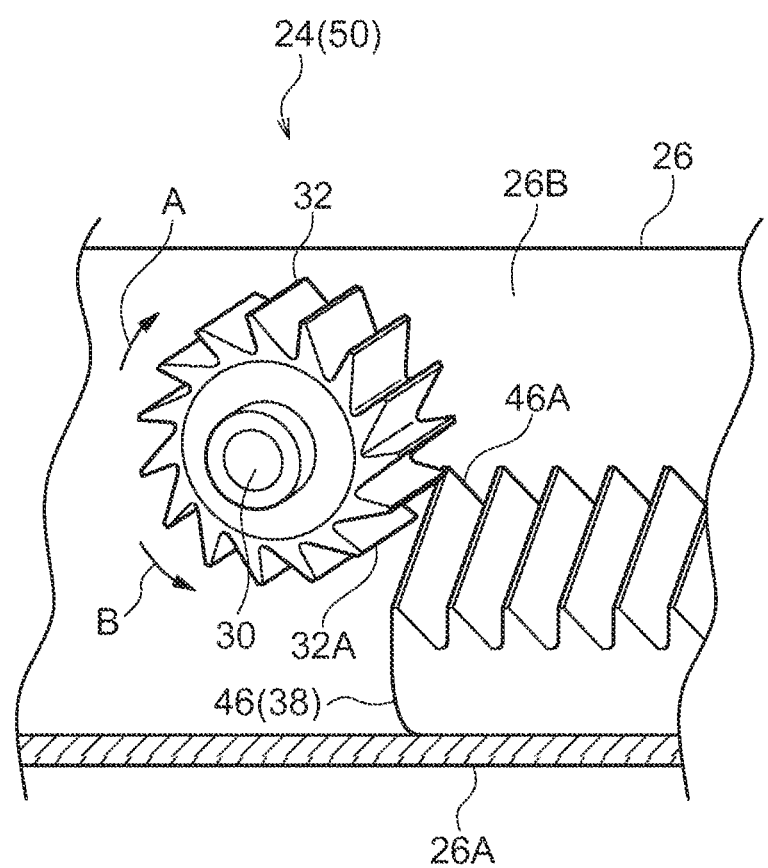
FIG. 9 is a cross-section view illustrating the piston and the pinion of the pre-tensioning mechanism of the second exemplary embodiment of the present invention as viewed from the one side.
Figure 10:
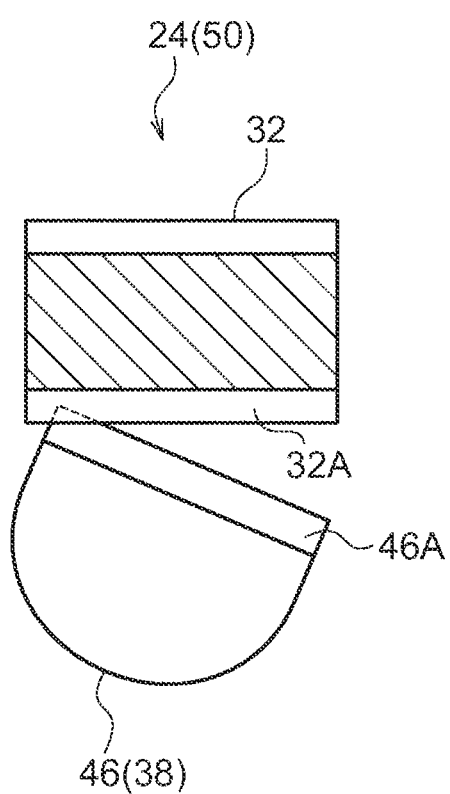
FIG. 10 is a cross-section view illustrating the piston and the pinion of the pre-tensioning mechanism of the second exemplary embodiment of the present invention, as viewed from an upper side.

As illustrated by FIG. 5 and FIG. 8A, in the pre-tensioning mechanism 24 of the webbing take-up device 50 of the present exemplary embodiment, the piston 38 is disposed in a state axially rotated relative to the arrangement thereof in the first exemplary embodiment such that the extension direction of the rack teeth 46A of the piston 38 (the rack 46) is inclined (angled) with respect to the extension direction of the pinion teeth 32A of the pinion 32. Thus, as shown in FIG. 9 and FIG. 10, overlap in the axial direction of the piston 38 occurs between a tip end of only one end portion in the extension direction of the rack teeth 46A and a tip end of only intermediate portion in the extension direction of the pinion teeth 32A.

The same operations and advantageous effects are thus obtainable for the present exemplary embodiment as for the first exemplary embodiment.

The extension direction of the rack teeth 46A of the piston 38 (the rack 46) is inclined (angled) with respect to the extension direction of the pinion teeth 32A of the pinion 32.

Figure 6:
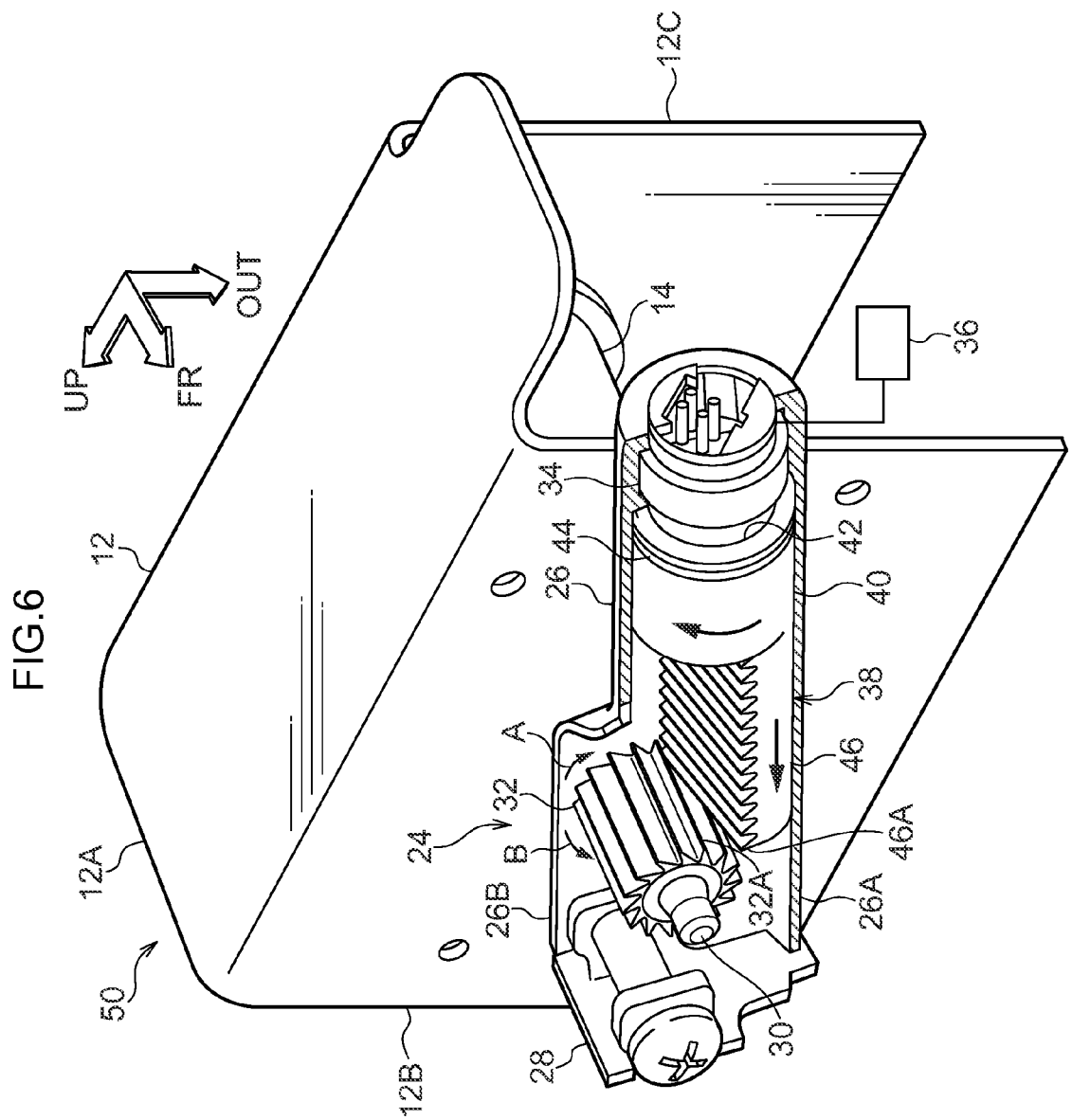
FIG. 6 is a perspective view illustrating a piston and a pinion of the webbing take-up device of the second exemplary embodiment of the present invention before meshing start.
Figure 8B:
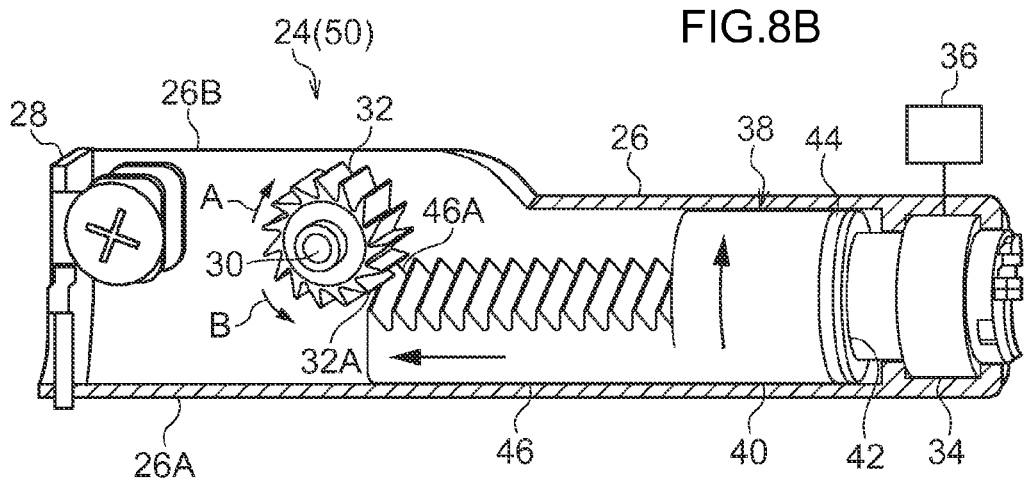

The tip end of the extension direction one end portion of the first rack tooth 46A is thus easily broken (sheared, severed) or crushing deformed by the tip end of the extension direction intermediate portion of the first pinion tooth 32A when the first rack tooth 46A meshes with the first pinion tooth 32A, and especially by that the tip end of the extension direction one end portion (one portion) of the first rack tooth 46A meshes with the tip end of the extension direction intermediate portion (one portion) of the first pinion tooth 32A (see FIG. 6 and FIG. 8B). Therefore, sticking-in (digging-in) of the first rack tooth 46A and the first pinion tooth 32A can be effectively suppressed, or sticking-in of the first rack tooth 46A and the first pinion tooth 32A can be easily released, enabling the loss of force transmitted from the piston 38 (the rack 46) to the pinion 32 to be reduced.

Figure 8C:
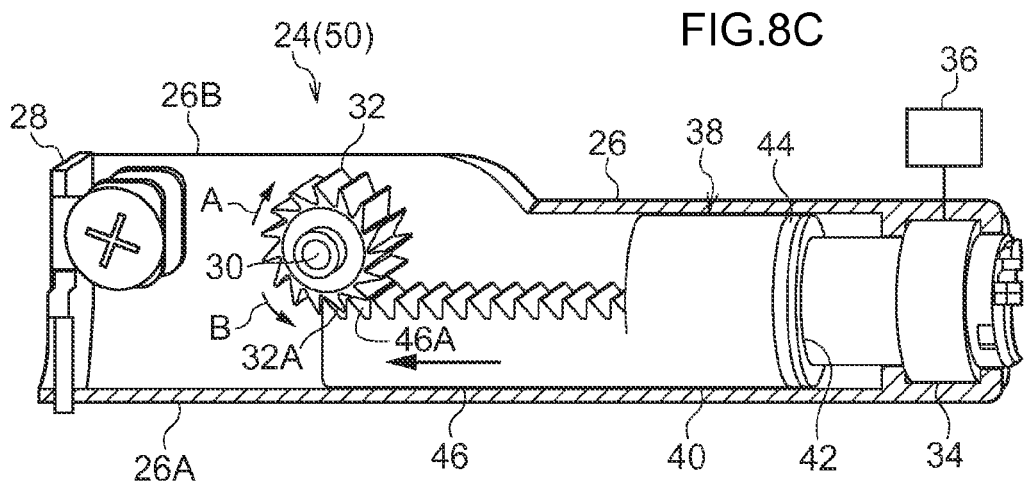

Moreover, after the first rack tooth 46A having meshed with the first pinion tooth 32A (especially when the tip end of the extension direction end portion of the first rack tooth 46A is crush-deformed by the tip end of the extension direction intermediate portion of the first pinion tooth 32A, when the second rack tooth 46A is meshed with the first pinion tooth 32A or the second pinion tooth 32A), due to the meshing of the pinion teeth 32A with the rack teeth 46A, the piston 38 can be rotated smoothly about its axis (a circumferential direction about the movement direction of the piston) while the circular cross-section outer peripheral face of the base portion 40 and the semicircular cross-section outer peripheral face of the rack 46 are being guided with the circular cross-section inner peripheral face of the lower side portion of the cylinder 26 and the semicircular cross-section inner peripheral face of the guide member 26A. The rack teeth 46A can accordingly easily rotate (displace) towards the pinion teeth 32A side, and the meshing amount in the extension direction of the pinion teeth 32A and the rack teeth 46A is easily increased. Thus, after at least the second rack tooth 46A having meshed with the first pinion tooth 32A or the second pinion tooth 32A, the extension direction of the rack teeth 46A is made to be parallel to the extension direction of the pinion teeth 32A, and the entire extension direction length of the rack teeth 46A becomes meshed with the entire extension direction length of the pinion teeth 32A (see FIG. 7 and FIG. 8C).

Consequently, after the second rack tooth 46A having meshed with the first pinion tooth 32A or with the second pinion tooth 32A, breaking or crushing deformation of the rack teeth 46A by the pinion teeth 32A can be always suppressed, thereby enabling effective transmission of force from the piston 38 (the rack 46) to the pinion 32.

Effective rotation of the pinion 32, the pinion shaft 30 and the spool 14 in the take-up direction by the movement of the piston 38 (the rack 46) is enabled, effective take-up of the webbing 16 by the spool 14 is enabled, and an effective increase in the restraining force of the webbing 16 upon the occupant is enabled thereby.

Note that according to the first exemplary embodiment and the second exemplary embodiment, the hardness of the rack teeth 46A is set less than that of the pinion teeth 32A, and the strength of the rack teeth 46A is set less than that of the pinion teeth 32A, and the first rack tooth 46A is therefore deformable when the first rack tooth 46A meshes with the first pinion tooth 32A. However, it is sufficient that at least one of the first rack tooth 46A or the first pinion tooth 32A is deformable when the first rack tooth 46A meshes with the first pinion tooth 32A. For example, it is possible that the hardness of the pinion teeth 32A is made less than that of the rack teeth 46A and the strength of the pinion teeth 32A is made less than that of the rack teeth 46A, thereby enabling the deformation of the first pinion tooth 32A when the first rack tooth 46A meshes with the first pinion tooth 32A.

Moreover, the present invention may be applied to actuating mechanisms in which a moving member is moved according to the actuation such as a seat belt device selectable force limiter switching mechanism, a lap pre-tensioning mechanism, or a buckle pre-tensioning mechanism for example.

What is claimed is:

1. A pre-tensioning mechanism comprising:
a webbing that is applied to an occupant of a vehicle;
a take-up member that takes up the webbing by rotating in a take-up direction;
a moving member that is provided with a plurality of moving teeth and is capable of moving; and
a rotating member that is capable of rotating according to rotation of the take-up member prior to the moving member moving, that is provided with a plurality of rotating teeth having a hardness different from a hardness of the plurality of moving teeth, and that rotates by the moving member moving and one of the plurality of moving teeth engaging with one of the plurality of rotating teeth whereby the take-up member is rotated in the take-up direction,
wherein, when the moving teeth initially engage with the rotating teeth, at least one of a moving tooth which is initially engaged or a rotating tooth which is initially engaged can be sheared or cut due to the difference in hardness between the moving teeth and the rotating teeth.

2. The pre-tensioning mechanism of claim 1, wherein two or more of the plurality of moving teeth are engaged at the same time with two or more of the plurality of rotating teeth when the moving member is moved.

3. The pre-tensioning mechanism of claim 2, wherein one end portion in an extension direction of either the moving tooth which is initially engaged or the rotating tooth which is initially engaged is engaged with the other of the moving tooth or the rotating tooth when the moving tooth initially engages with the rotating tooth.

4. The pre-tensioning mechanism of claim 3, wherein the moving tooth is displaced toward a side of the rotating tooth by the moving tooth engaging with the rotating tooth, whereby an amount of engagement of one of the moving tooth or the rotating tooth with the other of the moving tooth or the rotating tooth portion is increased.

5. The pre-tensioning mechanism of claim 1, wherein one end portion in an extension direction of either the moving tooth which is initially engaged or the rotating tooth which is initially engaged is engaged with the other of the moving tooth or the rotating tooth when the moving tooth initially engages with the rotating tooth.

6. The pre-tensioning mechanism of claim 5, wherein the moving tooth is displaced toward a side of the rotating tooth by the moving tooth engaging with the rotating tooth, whereby an amount of engagement of one of the moving tooth or the rotating tooth with the other of the moving tooth or the rotating tooth portion is increased.

7. The pre-tensioning mechanism of claim 6, further comprising a guide member that is configured to enable guiding of movement of the moving member, wherein: the guide member is provided with an inner peripheral face having a circular arc shape in cross-section, and an outer peripheral face, having a circular arc shape in cross-section, of the moving member is disposed at the inner peripheral face of the guide member in a state in which an extension direction of the moving tooth is inclined with respect to the extension direction of the rotating tooth.

8. The pre-tensioning mechanism of claim 5, further comprising a guide member that is configured to enable guiding of movement of the moving member, wherein: the guide member is provided with an inner peripheral face having a circular arc shape in cross-section, and an outer peripheral face, having a circular arc shape in cross-section, of the moving member is disposed at the inner peripheral face of the guide member in a state in which an extension direction of the moving tooth is inclined with respect to the extension direction of the rotating tooth.

9. The pre-tensioning mechanism of claim 1, wherein the plurality of moving teeth are disposed along the longitudinal direction of the moving member and disposed in a linear manner.

10. The pre-tensioning mechanism of claim 1, wherein the plurality of moving teeth and the plurality of rotating teeth are formed from metal.

* * * * *